(12) United States Patent
Rawe et al.

(10) Patent No.: US 10,508,547 B2
(45) Date of Patent: Dec. 17, 2019

(54) RADIAL TIE-BOLT SUPPORT SPRING

(71) Applicant: GENERAL ELECTRIC COMPANY, Schenectady, NY (US)

(72) Inventors: Benjamin Vincent Rawe, Alexandria, KY (US); Robert C. Von Der Esch, Salem, MA (US); Jason Francis Pepi, North Andover, MA (US); David William Crall, Loveland, OH (US)

(73) Assignee: General Electric Company, Schenectady, NY (US)

( * ) Notice: Subject to any disclaimer, the term of this patent is extended or adjusted under 35 U.S.C. 154(b) by 572 days.

(21) Appl. No.: 15/039,751

(22) PCT Filed: Nov. 25, 2014

(86) PCT No.: PCT/US2014/067214
§ 371 (c)(1),
(2) Date: May 26, 2016

(87) PCT Pub. No.: WO2015/081037
PCT Pub. Date: Jun. 4, 2015

(65) Prior Publication Data
US 2016/0376889 A1 Dec. 29, 2016

Related U.S. Application Data

(60) Provisional application No. 61/909,069, filed on Nov. 26, 2013.

(51) Int. Cl.
*F01D 5/06* (2006.01)
*F04D 19/02* (2006.01)
*F04D 29/32* (2006.01)
*F04D 29/26* (2006.01)
*F01D 11/00* (2006.01)

(52) U.S. Cl.
CPC ............. *F01D 5/066* (2013.01); *F04D 19/02* (2013.01); *F04D 29/266* (2013.01); *F04D 29/321* (2013.01); *F01D 11/003* (2013.01); *F05D 2220/32* (2013.01); *F05D 2240/20* (2013.01); *F05D 2250/75* (2013.01); *F05D 2260/30* (2013.01); *Y02T 50/671* (2013.01)

(58) Field of Classification Search
None
See application file for complete search history.

(56) References Cited

U.S. PATENT DOCUMENTS 2,579,745 A 12/1951 Albert et al.
3,976,399 A 8/1976 Schmoch
4,247,256 A 1/1981 Maghon
(Continued)

OTHER PUBLICATIONS

Notification of Reasons for Refusal issued in connection with corresponding JP Application No. 2016-533574 dated May 30, 2017.
(Continued)

*Primary Examiner* — Igor Kershteyn
*Assistant Examiner* — Juan G Flores
(74) *Attorney, Agent, or Firm* — Dority & Manning, P.A.

(57) ABSTRACT

According to some embodiments, a tie-bolt support assembly is provided which includes a support spring for engagement with both the tie-bolt and a rotor assembly to maintain a load path between the tie-bolt and the rotor assembly while also allowing for axial movement of the tie-bolt.

16 Claims, 7 Drawing Sheets

(56) References Cited

U.S. PATENT DOCUMENTS

| | | | |
|---|---|---|---|
| 5,537,814 A | 7/1996 | Nastuk et al. | |
| 6,250,618 B1 | 6/2001 | Greenhill | |
| 8,152,471 B2 | 4/2012 | Pichel | |
| 8,506,239 B2 | 8/2013 | Benkler et al. | |
| 8,939,710 B2* | 1/2015 | Webb | F16J 15/164 415/111 |
| 2012/0112415 A1* | 5/2012 | Benjamin | F01D 11/003 277/303 |
| 2013/0051993 A1* | 2/2013 | Webb | F01D 11/005 415/173.7 |

OTHER PUBLICATIONS

Extended European Search Report and Opinion issued in connection with corresponding EP Application No. 14865103.7 dated Jul. 13, 2017.

PCT Search Report and Written Opinion issued in connection with corresponding Application No. PCT/US2014/067214 dated Feb. 25, 2015.

* cited by examiner

RADIAL TIE-BOLT SUPPORT SPRING

CROSS-REFERENCE TO RELATED APPLICATIONS

This application is a national stage application under 35 U.S.C. § 371 (c) of prior filed, PCT application serial number PCT/US2014/067214, filed on Nov. 25, 2014, which claims priority to U.S. patent application Ser. No. 61/909,069, titled "Radial Tie-Bolt Support Spring", filed Nov. 26, 2013. The above-listed applications are incorporated by reference herein.

BACKGROUND

Present embodiments relate generally to a gas turbine engine. More specifically, the present embodiments relate, but are not limited, to a radial tie-bolt support spring which increases the natural frequencies of the tie-bolt system by providing a lateral load path between the tie-bolt and the surrounding rotor structure.

A typical gas turbine engine generally possesses a forward end and an aft end with its several core or propulsion components positioned axially therebetween. An air inlet is located at a forward end of the engine. Moving toward the aft end, in order, the intake is followed by a fan, a compressor, a combustion chamber, and a turbine. It will be readily apparent from those skilled in the art that additional components may also be included in the gas turbine engine, such as, for example, low pressure and high pressure compressors, and low pressure and high pressure turbines. This, however, is not an exhaustive list.

The compressors and turbines generally include rows of airfoils that are stacked axially in stages. Each stage includes a row of circumferentially spaced stator vanes and a row of rotor blades which rotate about a high pressure or low pressure shat of the gas turbine engine. The multi-stage low pressure turbine follows the multi-stage high pressure turbine and is typically joined by the low pressure shaft to a fan disposed upstream from the low pressure compressor in a typical turbo fan aircraft engine configuration for powering an aircraft in flight.

The stator is formed by a plurality of nozzle segments which are abutted at circumferential ends to form a complete ring about the axis of the gas turbine engine. Each nozzle segment may comprise a single stator vane, commonly referred to as a singlet. Alternatively, a nozzle segment may have two stator vanes per segment, which are generally referred to as doublets. In a third embodiment, additional numbers of vanes may be disposed on a single segment. In these embodiments, the vanes extend between an inner band and an outer band.

In operation, the high pressure turbine and low pressure turbine function to maximize extraction of energy from high temperature combustion gas. The turbine section typically has a high pressure or low pressure shaft axially disposed along a center longitudinal axis of the gas turbine engine. The airfoil shaped rotor blades are circumferentially distributed on the rotor causing rotation of the internal shaft by interaction with combustion exhaust gas.

The high pressure and low pressure shafts connect to the rotor and the air compressor, such that the turbines provide rotational input to the high and low pressure air compressors respectively to drive the compressor blades. This powers the compressor during operation and subsequently drives the turbine. As the combustion gas flows downstream through the turbine stages, energy is extracted therefrom and the pressure of the combustion gas is reduced.

Some gas turbine engines utilize a tie-bolt which may extend in an axial direction through a gas turbine engine. The tie-bolt may be utilized to connect one or more compressor modules to one another and/or more turbine modules. The tie-bolt may allow the turbine modules to be removed without deconstruction of the compressor modules. Current tie-bolt systems may have various natural frequencies at which the tie-bolt may deflect laterally and whirl about the engine centerline, similar to the action of a "jump-rope".

With current embodiments, a spanner nut may be utilized to maintain connection between an axially rearward portion of the compressor and an axial midpoint of the tie-bolt. Such spanner nut allows the compressor to maintain its assembled condition when the turbine module is removed from the gas turbine engine. The spanner nut also improves the stiffness of the tie-bolt to inhibit, or increase the natural frequency of, such "jump-rope" mode. However, the rotor structure required to employ this midpoint spanner nut is a relatively heavy component which if removed, would result in improved engine performance. While it would be desirable to reduce the weight associated with the spanner nut, removal of the spanner nut decreases the rigidity of the tie-bolt allowing increased lateral vibratory motion. Lateral motion is defined as displacement of a component or portion of a component, normally concentric with the rotor, such that the component's centerline is no longer coincident with the overall rotor centerline.

It would be desirable to improve these conditions to reduce weight of the midpoint spanner nut assembly without also decreasing the natural frequencies of the tie-bolt by not transferring lateral load of the tie-bolt.

The information included in this Background section of the specification, including any references cited herein and any description or discussion thereof, is included for technical reference purposes only and is not to be regarded subject matter by which the scope of the instant embodiments are to be bound.

BRIEF DESCRIPTION OF THE INVENTION

According to some embodiments, a tie-bolt support assembly is provided which includes a support spring for engagement with both the tie-bolt and a rotor assembly to maintain a load path between the tie-bolt and the rotor assembly while also allowing for axial movement of the tie-bolt.

According to some other embodiments, a tie-bolt support assembly comprises an axial flow compressor having a plurality of rotor disks and a plurality of rotor blades extending from the rotor disks, a tie-bolt extending axially through the axial flow compressor, the tie-bolt having a circumferential groove extending about an outer diameter of the tie-bolt, a spring disposed in the groove and capable of axial movement within the groove, wherein the spring engages at least one of the plurality of rotor disks to maintain a radial force on the at least one rotor disk.

All of the above outlined features are to be understood as exemplary only and many more features and objectives of the tie-bolt support assembly may be gleaned from the disclosure herein. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims. Therefore, no limiting interpretation of this summary is to be understood without further reading of the entire specification, claims, and drawings included herewith.

BRIEF DESCRIPTION OF THE DRAWINGS

The above-mentioned and other features and advantages of these exemplary embodiments, and the manner of attaining them, will become more apparent and the tie-bolt support assembly feature will be better understood by reference to the following description of embodiments taken in conjunction with the accompanying drawings, wherein.

DETAILED DESCRIPTION

Figure 1:
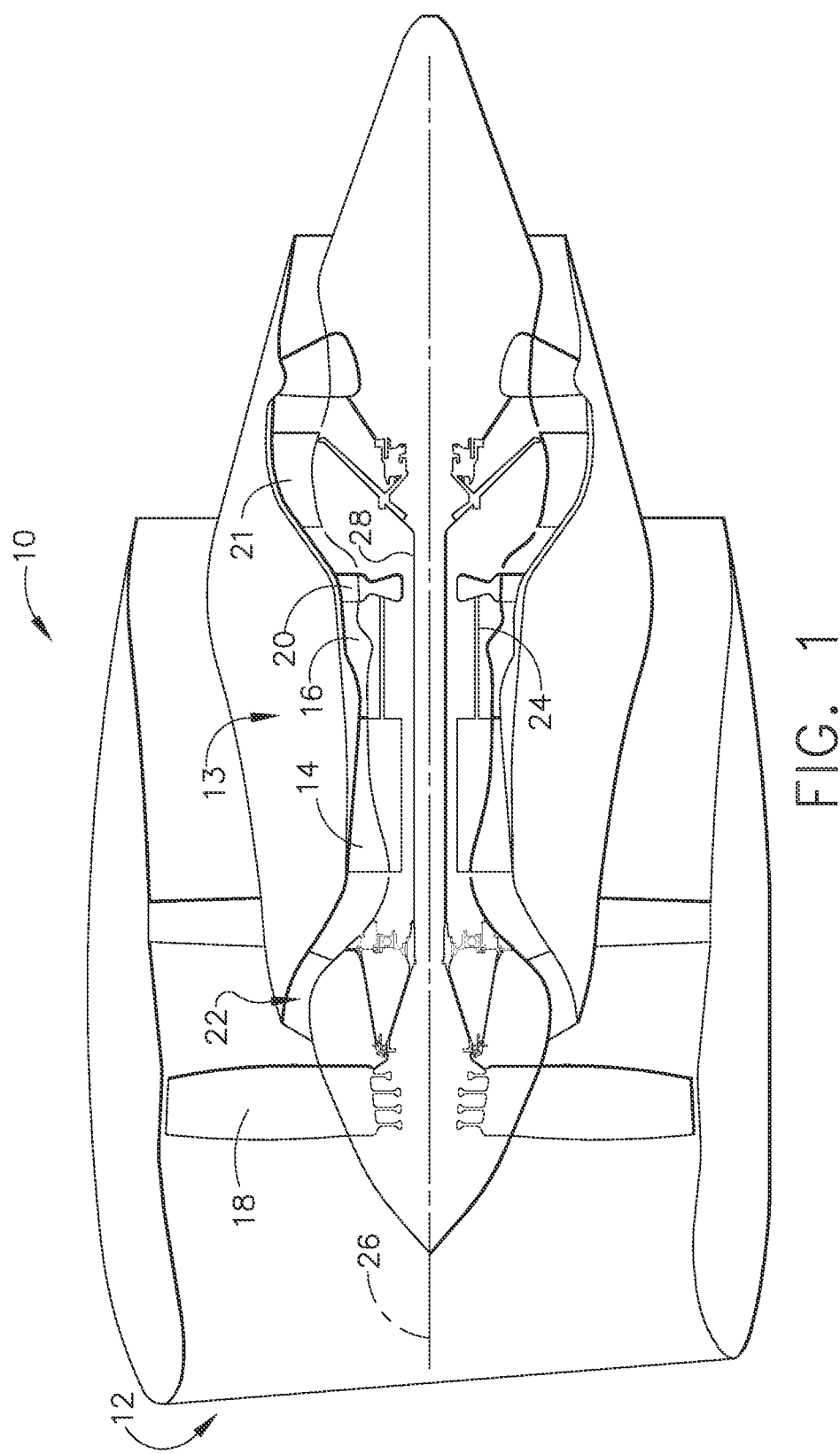
FIG. 1 is a schematic side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus, it is intended that the present invention covers such modifications and variations as come within the scope of the appended claims and their equivalents.

Referring to FIGS. 1-7, various embodiments of a gas turbine engine having a tie-bolt support assembly. The assembly reduces weight of the rotor while providing lateral support to a tie-bolt and resisting asymmetric deflection wherein the center line of the tie-bolt shifts.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

Referring initially to FIG. 1, a schematic side section view of a gas turbine engine 10 is shown. The function of the gas turbine engine 10 is to extract energy from high pressure and temperature combustion gases and convert the energy into mechanical energy for work. The gas turbine engine 10 has an engine inlet end 12 wherein air enters the core propulsor 13 which is defined generally by a high pressure compressor 14, a combustor 16 and a multi-stage high pressure turbine 20. Collectively, the core propulsor 13 provides thrust or power during operation. The gas turbine engine 10 may be used for aviation, power generation, industrial, marine or the like.

In operation, air enters through the engine inlet end 12 of the gas turbine engine 10 and moves through at least one stage of compression where the air pressure is increased and directed to the combustor 16. The compressed air is mixed with fuel and burned, providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the gas turbine engine to continue rotation of the one or more high pressure compressor 14 stages. A low pressure shaft 28 extends between a low pressure compressor 22 and a low pressure turbine 21. A turbofan 18 or inlet fan blades, depending on the turbine design may also be connected by the low pressure shaft 28 to a low pressure turbine 21 and creates thrust for the gas turbine engine 10. The low pressure turbine 21 may also be utilized to extract further energy and power additional compressor stages.

Figure 2:
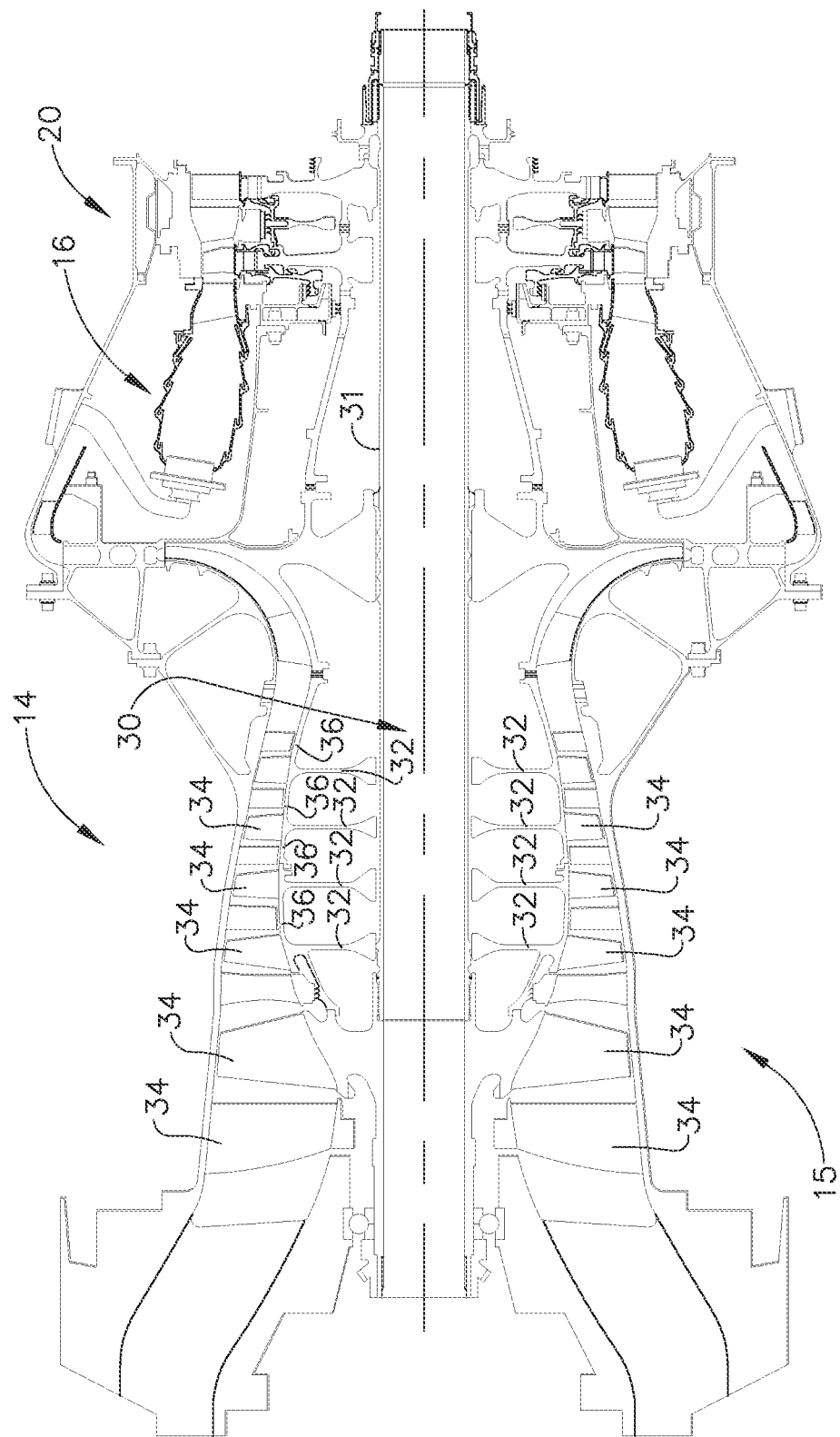
FIG. 2 is a schematic view of a first embodiment of a tie-bolt assembly.

Referring now to FIG. 2, a schematic view of a first embodiment of a tie-bolt assembly 30 is depicted. The tie-bolt assembly 30 provides for separable engagement of high pressure compressor 14 modules and/or turbine 20 modules through non-bolted joints. This construction eliminates flanges and bolted connection of turbine and compressor modules which are relatively heavy. The tie-bolt assembly 30 affords axial retention of separable rotor components through application of a compressive load through the tie-bolt assembly 30. The tie-bolt 31 is tubular in cross-section and extends axially from a forward end of the high pressure compressor 14 toward an aft end and into the turbine 20.

A high pressure compressor 14 includes a rotor assembly 15 including a plurality of blades 34 which are each connected to rotor disks 32. The rotor disks 32 extend in a radial direction in the depicted view. The rotor assembly 15 further includes a plurality of projections 36 extending between rotor disks 32 and radially inward of the blades 34. As described further, support springs 60 (FIG. 3) of the instant embodiments may be positioned to interface between rotor disks 32 and tie-bolt 31, as well as other locations.

Figure 3:
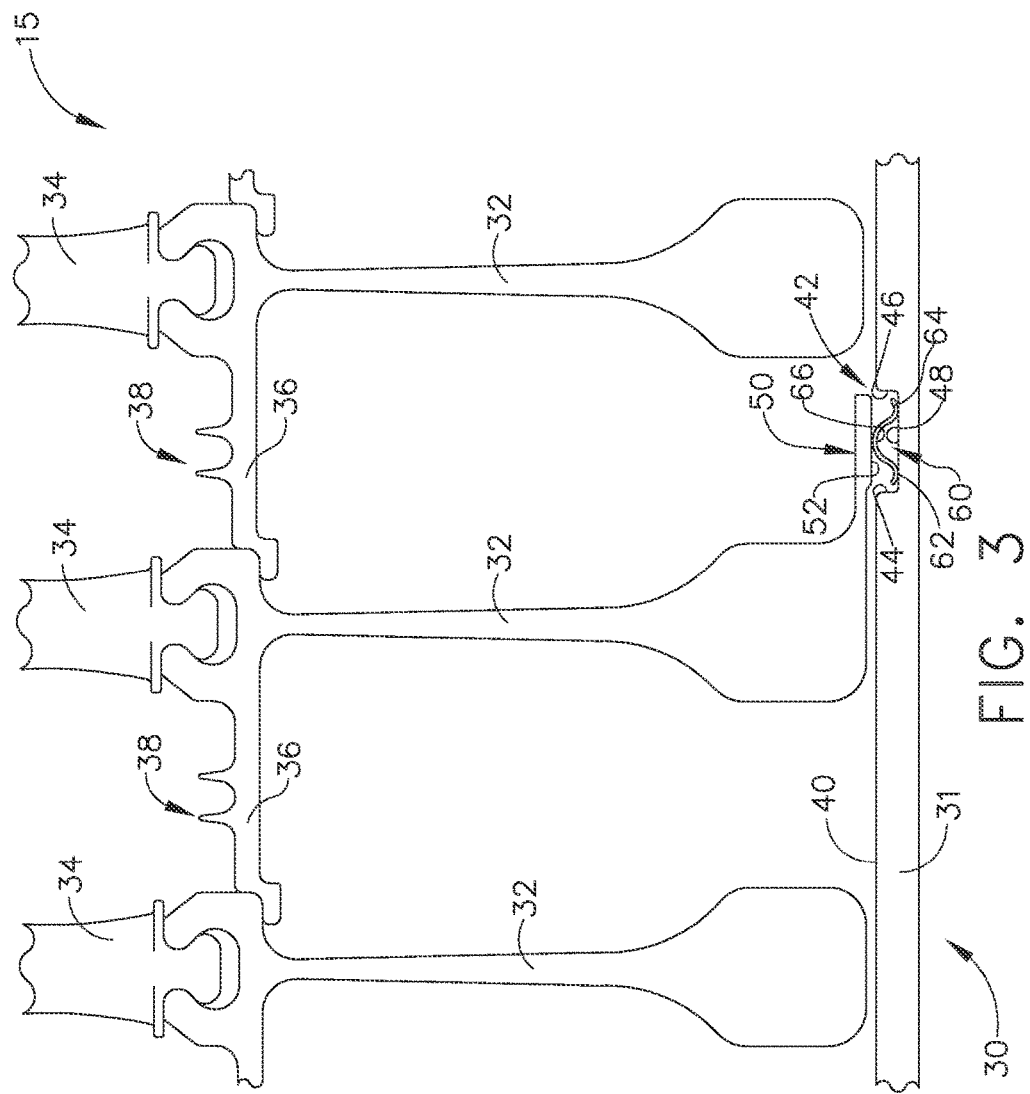
FIG. 3 is a detailed schematic view of a tie-bolt assembly including a spring.

Referring now to FIG. 3, a detailed schematic view of the tie-bolt assembly 30 within the high pressure compressor 14 (FIG. 1) is depicted adjacent various rotor disks 32 of a rotor assembly 15. The tie-bolt assembly 30 extends in an axial direction and multiple rotor disks 32 are depicted extending in a radial direction from near the outer surface 40 of the tie-bolt assembly 30. The tie-bolt assembly 30 may be arranged in various manners so not to touch the rotor disks 32. For example, the rotor disks 32 may have a hole through which the tie-bolt assembly 30 passes. The rotor disks may be connected to the tie-bolt assembly 30 in a variety of ways. At radial outward ends of the rotor disks 32 are blades 34. The blades 34 are shown connected to the rotor disk 32 in a dovetail arrangement wherein the rotor disk 32 and blade 34 are connected mechanically. However, these structures may also be combined to form a blisk arrangement which may be known to one skilled in the art as a unitary construction of the disk and blade. These arrangements may be used independently or in combination. Extending between rotor disks 32 are the projections 36. The projections 36 extend in a generally axial direction and may include sealing teeth 38 extending in a radial direction to engage stator portions of the high pressure compressor 14. Although the projections 36 are shown as substantially linear, they may be curvilinear.

Along the outer surface 40 of the tie-bolt assembly 30, a groove 42 is positioned in the tie-bolt 31. The groove 42 may extend circumferentially about the tie-bolt 31. The groove 42 may extend about the entire outer surface 40 or may be less than 360 degrees about the outer surface 40. Additionally, the groove 42 may be defined as a single continuous groove 42 in the circumferential direction or may be defined by a plurality of discontinuous sections in the circumferential direction.

The groove 42 is generally u-shaped in cross-section having a first sidewall 44, a second sidewall 46 and a seat 48. The seat 48 generally extends axially between the radially extending sidewalls 44, 46 as depicted. Alternatively, the sidewalls 44, 46 may be at a non-perpendicular angle to the seat 48 as depicted. However, this specific u-shape and cross-section is merely one embodiment and alternate sections, shapes and configurations such as v-shaped sections may be used. For example, the seat 48 may be angled or formed of two or more segments rather than the single segment depicted. The seat 48 may further comprise locating features such as detents, bosses or recesses for positioning of a spring 60.

Extending from the rotor disk 32 is a foot 50. The foot 50 extends in a generally axial direction above the groove 42. While the foot 50 is shown as substantially linear, curvilinear structures may be used as well. The foot 50 has an undersurface 52 which is engaged by the spring 60. The foot 50 may extend in the circumferential direction about 360 degrees as a single construction or may extend in two or more segments. The foot 50 allows for transfer of lateral loads from the tie-bolt assembly 30 to the rotor assembly 15 which provides lateral support for the tie-bolt 31. Additionally, the engagement between the spring 60, tie-bolt 31 and foot 50 increases the natural frequency of the tie-bolt 31 such that the natural frequency is increased above sufficient margins above the engine operating speed.

The foot 50 includes a smooth circumferentially extending undersurface 52 for engagement with the spring 60. The undersurface 52 is positioned above, or radially spaced from, the groove 42 and opposite the seat 48. The undersurface 52 provides an upper limit and the seat 48 provides a lower limit, both in the radial direction. The undersurface 52 may also have locating features to retain the spring 60 in position. Additionally, the groove 42 provides a positive axial locating feature on the tie-bolt assembly 30 for the spring 60. These features help maintain engagement between the parts.

The foot 50 is spaced apart from the seat 48 a distance which is less than a height 72 (FIG. 6) of the spring 60 so that a radial interference always exists between the spring 60 and the foot 50. This applies a pre-load to the spring 60 with radial compression. When the gas turbine engine is not operating, the spring 60 is engaging the foot 50. When the gas turbine engine is operating and thermal expansion occurs, the spring 60 maintains engagement despite dimensional changes associated with expansion of either of the rotor disk 32, foot 50, tie-bolt 31 or spring 60.

For example, due to varying thermal conditions during engine operation, the spacing between the foot 50 and the seat 48 may change as the rotor disk 32 grows in a radial direction. The radial interference is greater than the range of relative motion between the foot 50 and the seat 48 so that the spring 60 is continuously engaging the foot 50 during transient operation conditions, steady-state operating conditions and during engine shutdown.

The spring 60 is generally depicted as inverted u-shaped. The spring 60 is described further in FIG. 5 but includes first and second spring feet 62, 64 which engage the seat 48 and a crest or intermediate portion 66 which engages the foot 50. Although the u-shape is inverted according to the instant embodiment, it is within the scope of the present embodiments that the spring 60 be flipped so that the spring 60 ends engage the foot 50 and the intermediate portion 66 engage the tie-bolt 31 opposite the configuration depicted in FIG. 3.

As additionally seen in FIG. 3, the spring 60 has a length in the axial direction which is less than the length of groove 42. This allows the spring 60 to be seated therein. Also, this allows the spring 60 to move axially within the groove 42, independent of flexing, without carrying axial loading.

Figure 4:
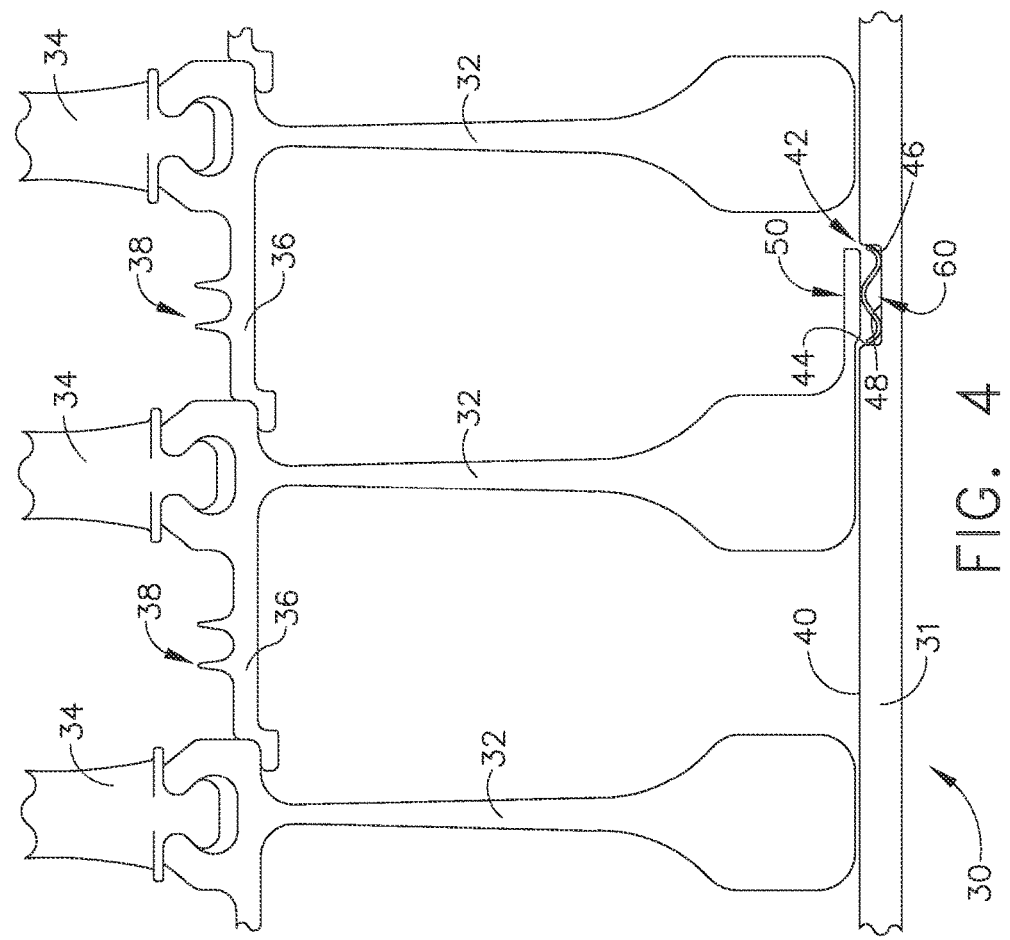
FIG. 4 is the embodiment of FIG. 3 as shown with the spring in a flexed position.

Referring now to FIG. 4, the embodiment of FIG. 3 is shown with the spring 60 flexed so that the ends of the spring 60 are pushed in the axial directions toward the sidewalls 44, 46 of the groove 42. During flexing of the spring 60, the ends of the spring 60 may move in axial directions. However, the rotor disks 32 are not engaging the tie-bolt assembly 30 despite the radial or lateral movement. Thus, the groove 42 has an axial dimension which is greater than that of the spring 60 to allow for such flexing of the spring 60 in the axial direction. Further, during operation, it is intended that the spring 60 be able to slide within the groove 42 along the seat 48 as previously described. This inhibits axial loading on the spring 60 while still allowing for radial and lateral loads between the rotor assembly 15 and the tie-bolt assembly 30.

Figure 5:
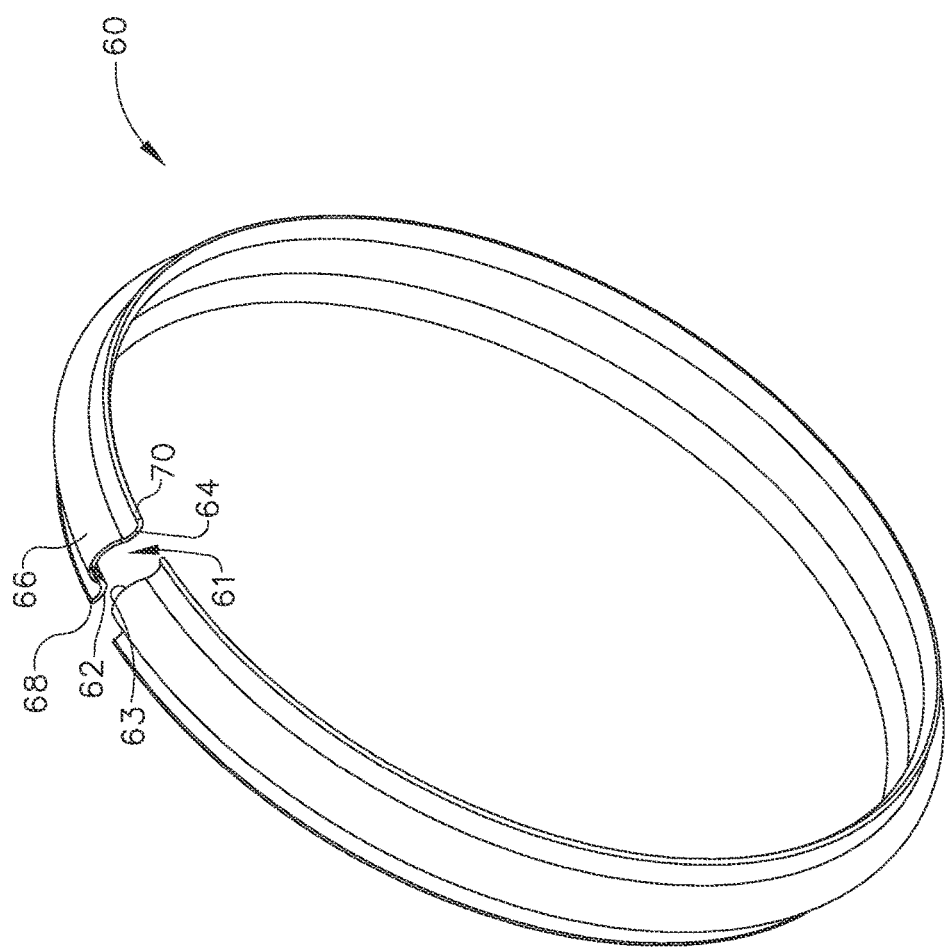
FIG. 5 is an isometric view of the spring.
Figure 6:
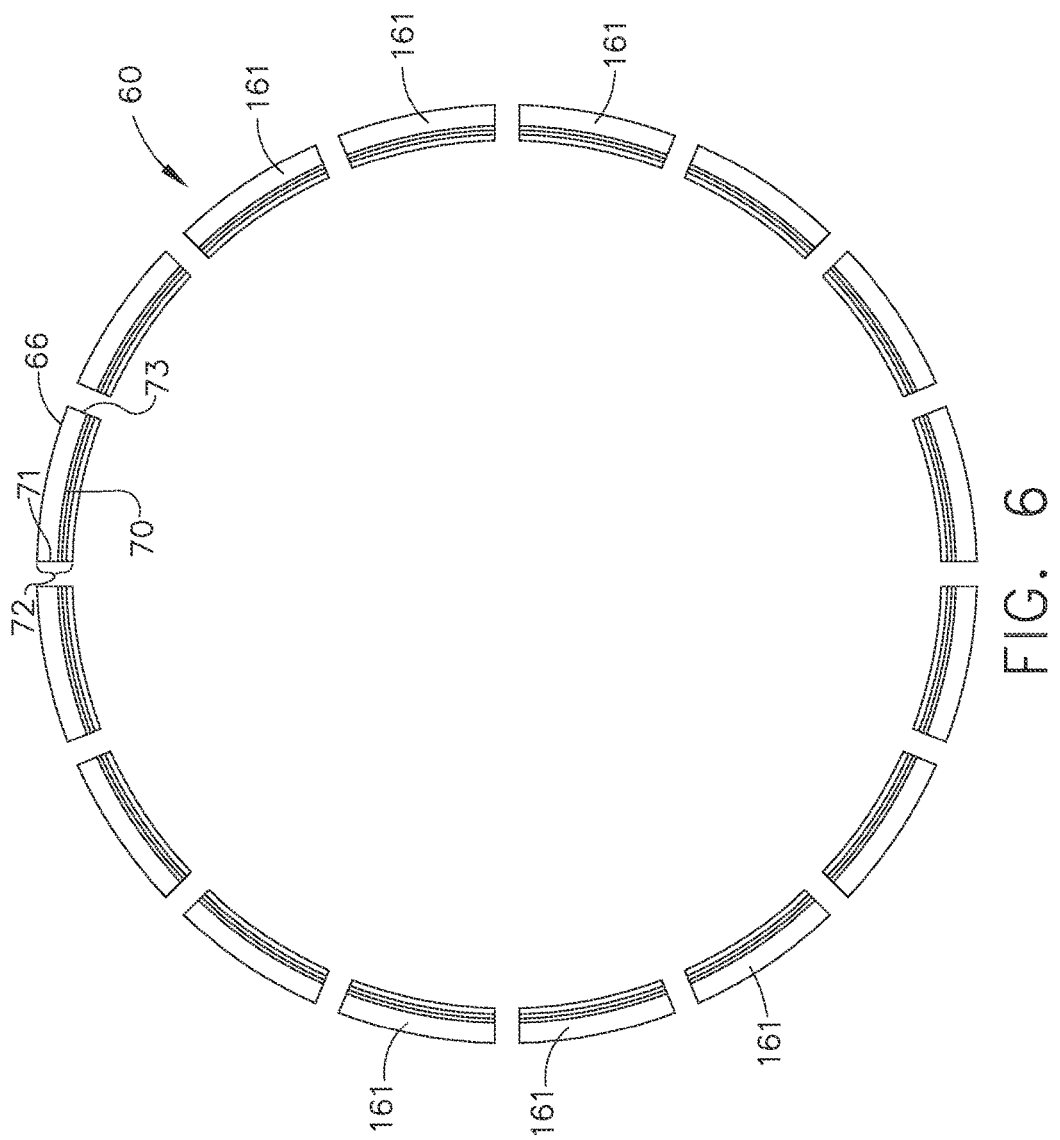
FIG. 6 is an axial view of an alternate spring embodiment.

Referring now to FIG. 5, an isometric view of the spring 60 is depicted. The spring 60 of the instant embodiment is generally continuous for nearly 360 degrees. However, circumferential ends 61, 63 (FIG. 6) of the spring 60 are disconnected to allow for positioning of the spring 60 about the tie-bolt 31. Additionally, as previously indicated, the spring 60 may be split up into multiple segments 161 as shown in FIG. 6 rather than a substantially continuous structure as depicted. The one or more springs 60 have a first circumferential end 61 and a second circumferential end 63. The spring 60 includes a first axial end 68 and a second axial end 70 between which are first and second spring feet 62, 64 and an intermediate portion 66. As previously shown, the spring feet 62, 64 are seated within the groove 42 of the tie-bolt 31. The feet 62, 64 may be at axial ends or the spring 60 may be curled upwardly as depicted to inhibit the spring feet 62, 64 from gouging the seat 48 surface or otherwise inhibiting axial movement of the spring 60. The intermediate portion 66 engages the foot 50 to provide the load path between the tie-bolt assembly 30 and the rotor assembly 15.

As previously described, the spring 60 may also be inverted so that the spring feet 62, 64 engage the foot 50 and the intermediate portion 66 engages the seat 48 of the groove 42. Further, while the u-shaped spring structures are shown, it should be clear to one skilled in the art that other spring structures may be used such as helical springs, bladder-type springs or biasing structures or other urging components which further allow for axial movement.

Referring now to FIG. 6, an axial view of the alternative spring 60 embodiment is depicted. Instead of a single segment, a plurality of segments 161 are depicted each having circumferential ends 71, 73. The spring 60 is shown having the axial end 70 and a height 72. The height 72 varies with the flexing of the spring 60 as depicted by comparing FIGS. 3 and 4. With the flexing of the spring 60, the ends 70, 68 (FIG. 5) move in the axial directions again as shown by comparing FIGS. 3 and 4. The height 72 is of such dimension as to provide continual interference fit between foot 50 and the tie-bolt 31 as previously shown and discussed.

Additionally, since the embodiment depicts the spring 60 broken up into multiple segments 161 extending circumferentially, the groove 42 may be formed of a plurality of circumferential segments corresponding to the length of the segments 161 of spring 60.

Figure 7:
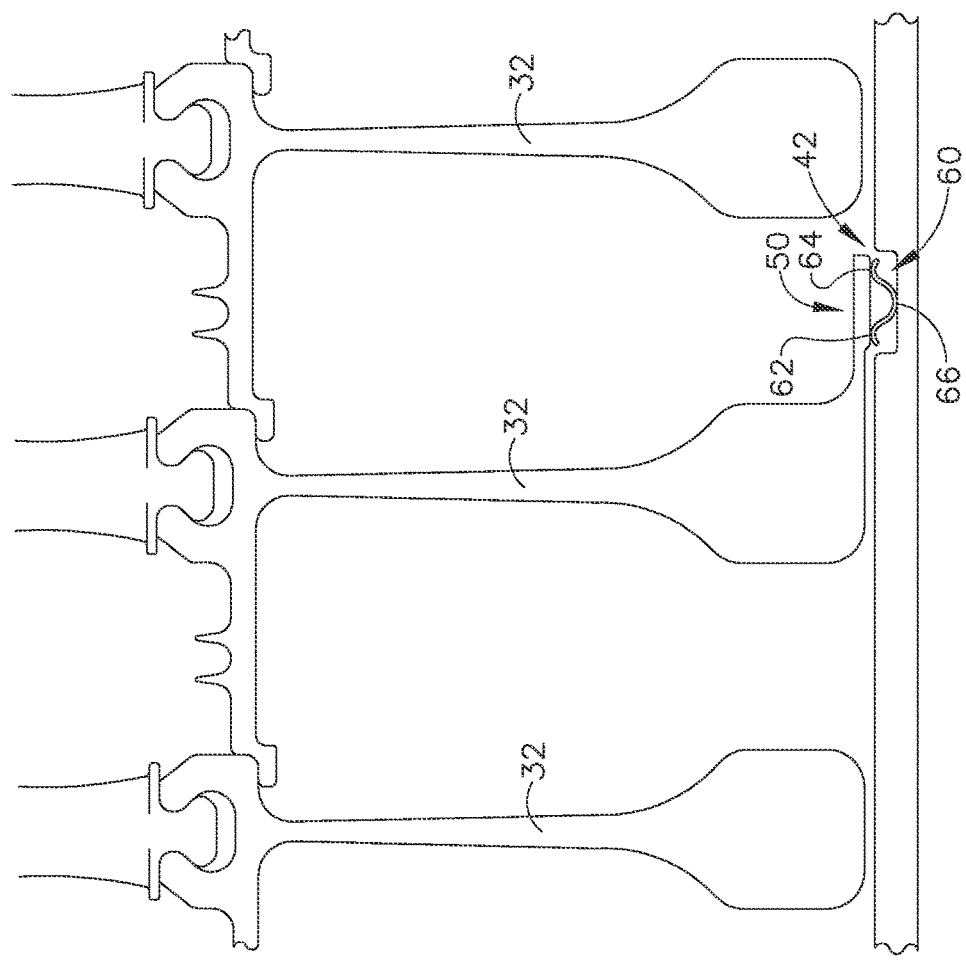
FIG. 7 is a side section view of a further alternate spring with an inverted configuration.

Referring now to FIG. 7, the spring 60 is depicted in an upside down or inverted position. The intermediate portion 66 is depicted engaging the tie-bolt 31 and the spring feet 62, 64 are depicted engaging the foot 50 of the rotor disk 32.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A tie-bolt support assembly, comprising:
   an axial flow compressor having a plurality of rotor disks and a plurality of rotor blades extending from said plurality of rotor disks;
   a tie-bolt extending axially through said axial flow compressor, said tie-bolt having a circumferential groove extending about an outer diameter of said tie-bolt;
   a spring disposed in said groove and capable of axial movement within said groove;
   said spring engaging at least one rotor disk of said plurality of rotor disks to maintain a radial force on said at least one rotor disk,
   wherein said spring has a radial height which is greater than a depth of said circumferential groove.

2. The tie-bolt support assembly of claim 1, wherein said spring maintains engagement with said at least one rotor disk when said spring is flexed and unflexed.

3. The tie-bolt support assembly of claim 1, wherein said groove has an axial length which is greater than an axial length of said spring in a normal condition.

4. The tie-bolt support assembly of claim 1, wherein said at least one rotor disk further comprises a foot which engages said spring.

5. The tie-bolt support assembly of claim 4, wherein said foot extends in an axial direction.

6. The tie-bolt support assembly of claim 4, wherein said foot and said spring maintain radial interference.

7. The tie-bolt support assembly of claim 1, engagement of said spring and said at least one rotor disk providing lateral support for said tie-bolt.

8. The tie-bolt support assembly of claim 1, wherein said spring is substantially u-shaped.

9. The tie-bolt support assembly of claim 8, wherein said spring further comprises first and second spring feet.

10. The tie-bolt support assembly of claim 9, wherein said first and second spring feet engages said groove.

11. The tie-bolt support assembly of claim 9, wherein said first and second spring feet engage said at least one rotor disk.

12. The tie-bolt support assembly of claim 8, wherein said spring is generally circumferential.

13. The tie-bolt support assembly of claim 12, wherein said spring has a first axial end and a second axial end.

14. The tie-bolt support assembly of claim 1, wherein said spring creates a lateral load path between said tie-bolt and said at least one rotor disk.

15. The tie-bolt support assembly of claim 1,
    wherein said tie-bolt is spaced away from said at least one rotor disk.

16. A tie-bolt support assembly, comprising:
    an axial flow compressor having a plurality of rotor disks and a plurality of rotor blades extending from said plurality of rotor disks;
    a tie-bolt extending axially through said axial flow compressor, said tie-bolt having a circumferential groove extending about an outer diameter of said tie-bolt;
    a spring disposed in said groove and capable of axial movement within said groove;
    said spring engaging at least one rotor disk of said plurality of rotor disks to maintain a radial force on said at least one rotor disk,
    wherein said spring is substantially u-shaped.

* * * * *